(12) United States Patent
Budzisz et al.

(10) Patent No.: US 10,516,714 B2
(45) Date of Patent: *Dec. 24, 2019

(54) METHOD AND APPARATUS FOR TRANSMITTING ENCODED MEDIA DATA

(71) Applicant: Unify GmbH & Co. KG, Munich (DE)

(72) Inventors: Lukasz Budzisz, Berlin (DE); Michael Doering, Fredersdorf (DE); Adam Wolisz, Berlin (DE); Phuoc Tran-Gia, Wuerzburg (DE); Thomas Zinner, Wuerzburg (DE); Steffen Gebert, Wuerzburg (DE); Frank Lehrieder, Wuerzburg (DE); Martina Zitterbart, Eggenstein (DE); Denis Martin, Karlsruhe (DE)

(73) Assignee: Unify GmbH & Co. KG, Munich (DE)

( * ) Notice: Subject to any disclaimer, the term of this patent is extended or adjusted under 35 U.S.C. 154(b) by 243 days.

This patent is subject to a terminal disclaimer.

(21) Appl. No.: 15/686,186

(22) Filed: Aug. 25, 2017

(65) Prior Publication Data
US 2017/0353517 A1    Dec. 7, 2017

Related U.S. Application Data

(63) Continuation of application No. 14/685,807, filed on Apr. 14, 2015, now Pat. No. 9,781,185.

(30) Foreign Application Priority Data

Apr. 25, 2014   (DE) .................. 10 2014 006 080

(51) Int. Cl.
*G06F 15/16* (2006.01)
*H04L 29/06* (2006.01)
(Continued)

(52) U.S. Cl.
CPC .......... *H04L 65/602* (2013.01); *H04L 65/607* (2013.01); *H04L 65/80* (2013.01);
(Continued)

(58) Field of Classification Search
CPC ..... H04L 65/602; H04L 65/607; H04L 65/80; H04N 19/156; H04N 19/164;
(Continued)

(56) References Cited

U.S. PATENT DOCUMENTS 9,781,185 B2 * 10/2017 Budzisz ......... H04N 21/234327
2006/0224763 A1   10/2006 Altunbasak et al.
(Continued)

FOREIGN PATENT DOCUMENTS

CN         101053215 A      10/2007
CN         101170685 A       4/2008
(Continued)

OTHER PUBLICATIONS

"TCP Extensions for Multipath Operation with Multiple Address," Internet Engineering Task Force; A. Ford, C. Raiciu, M. Handley, O. Bonaventure, dated Jan. 2013; http://www.rfc-base.org/txt/rfc-6824.txt.
(Continued)

*Primary Examiner* — Philip B Tran
(74) *Attorney, Agent, or Firm* — Buchanan Ingersoll & Rooney PC

(57) ABSTRACT

A method for transmitting encoded media data on the basis of a layer model includes dividing the media data onto a basic layer and at least one additional enhanced layer, transmitting the basic layer and the at least one enhanced layer via at least two network accesses, selecting a first network access to transmit the basic layer that has a network quality and/or stability that is sufficient for transmitting the basic layer; and selecting at least one second network access
(Continued)

from among the network accesses depending upon the bandwidth of the first network access and the quality and stability of the network accesses for transmitting the at least one enhanced layer. An apparatus can be configured to execute the method. In some embodiments, the apparatus can include a communication system, a server computer device and/or a mobile terminal.

19 Claims, 7 Drawing Sheets

(51) Int. Cl.
| | |
|---|---|
| *H04N 21/2343* | (2011.01) |
| *H04N 21/24* | (2011.01) |
| *H04N 21/4402* | (2011.01) |
| *H04N 21/442* | (2011.01) |
| *H04N 21/63* | (2011.01) |
| *H04N 21/6373* | (2011.01) |
| *H04N 21/647* | (2011.01) |
| *H04N 19/156* | (2014.01) |
| *H04N 19/164* | (2014.01) |

(52) U.S. Cl.
CPC ......... *H04N 19/156* (2014.11); *H04N 19/164* (2014.11); *H04N 21/234327* (2013.01); *H04N 21/2402* (2013.01); *H04N 21/44209* (2013.01); *H04N 21/440227* (2013.01); *H04N 21/631* (2013.01); *H04N 21/6373* (2013.01); *H04N 21/64738* (2013.01)

(58) Field of Classification Search
CPC ....... H04N 21/234327; H04N 21/2402; H04N 21/440227; H04N 21/44209; H04N 21/631; H04N 21/6373; H04N 21/64738
USPC .................................................. 709/219, 231
See application file for complete search history.

(56) References Cited

U.S. PATENT DOCUMENTS

| | | | |
|---|---|---|---|
| 2007/0111801 | A1 | 5/2007 | Haber et al. |
| 2008/0152000 | A1* | 6/2008 | Kaushik ............... H04N 19/197 375/240.03 |
| 2011/0299606 | A1 | 12/2011 | Chen et al. |
| 2013/0318251 | A1 | 11/2013 | Mohammad et al. |

FOREIGN PATENT DOCUMENTS

| | | | | |
|---|---|---|---|---|
| CN | 101668210 A | | 3/2010 | |
| CN | 101682586 A | | 3/2010 | |
| EP | 1742476 A1 | * | 1/2007 | ..... H04N 21/234327 |
| WO | 02/052860 A1 | | 7/2002 | |

OTHER PUBLICATIONS

"The PPP Multilink Protocol (MP)," Network Working Group; K. Sklower, B. Lloyd, G. McGregor, D. Carr, T. Coradetti, dated Aug. 1996; http://www.ietf.org/rfc/rfc1990.txt.

\* cited by examiner

METHOD AND APPARATUS FOR TRANSMITTING ENCODED MEDIA DATA

CROSS-REFERENCE TO RELATED APPLICATIONS

The present application is a continuation application of U.S. patent application Ser. No. 14/685,807, which claims priority to German Patent Application No. 10 2014 006 080.2.

FIELD OF THE INVENTION

The invention relates to a method and a device for transmitting encoded media data.

BACKGROUND OF THE INVENTION

For scalable video codecs (SVC), e.g., H.264 SVC or H.265 SVC, layers in addition to the basic layer ensure higher video quality levels and enable an adaption of the video quality of an already encoded video stream.

Nowadays, RTP control protocol (RTCP), as a band-internal feedback channel within Real-time Transport Protocol (RTP) from the target node(s) to the source node(s), carries information from which the actual end-to-end network service quality at the source node (e.g., packet loss rate, delay, jitter) can be derived. Based on this information, the encoder is able to start or restart the generation of additional layers at the source node for transmission, reduce the image frequency or frame rate or increase the compression ratio to reduce bandwidth consumption. To facilitate this, the end-to-end link is identified through a relationship between source node connection and target node connection. This concept also applies to point to multipoint connections, e.g., for video distribution services.

Another known concept dedicated to H.264 SVC is an intelligent router on which (mobile) devices or terminals register their capabilities, e.g., screen size, resolution, etc. The available bandwidth toward the device is also taken into account. The video source generates all layers of the SVC codec. This video stream is passed on via an intelligent router that decides for each individual target device how many layers will be passed on to that device based on the registration information. Accordingly, individual video streams are forwarded for each connection endpoint.

PPP-Multilink [RFC1990] describes, for example, bundling multiple links into one virtual link in the link layer. This conceals information about the differences between the access technologies used, and no further adaption of the transport layer with respect to different linking qualities is possible.

Multipath-TCP [RFC6824] allows different network paths to be exhausted by using subflows or partial flows. However, only one single transport service is provided for applications (i.e., reliable transport).

SUMMARY OF THE INVENTION

One problem that can be addressed by embodiments of the present invention is that of providing a method, a device and a system for transmitting encoded media data, which is capable of overcoming the aforementioned disadvantages of the prior art at least in part. In some embodiments, this problem can be solved by the features of the independent claims. Advantageous embodiments and developments of the invention are provided in the dependent claims.

For example, more than one network access can be utilized simultaneously to control the transmission of SVC layers automatically based on the current network quality. The network quality can be assessed, for example, either on the end-to-end basis, e.g., as defined by RTCP, or locally in each access technology, e.g., the signal-to-noise distance or signal-to-noise ratio (SNR) can be utilized.

Accordingly, a method for transmitting encoded media data on the basis of a layer model according to a first aspect of the invention can comprise the steps of:
a) dividing the media data onto a basic layer and at least one additional enhanced layer;
b) transmitting the basic layer and the at least one enhanced layer via at least two network accesses;
c) selecting a first network access point to transmit the basic layer that has a network quality and/or stability that is sufficient for transmitting the basic layer; and
d) selecting at least one second network access point from among the network accesses, depending upon the bandwidth of the first network access point and the quality and stability of the network accesses, to transmit the at least one enhanced layer.

Media data are in particular but not only audio data and/or video data and/or text data and/or video text data and/or conference data and/or application-specific data, etc. Also included are multimedia data such as combined audio/video data and/or conference data and/or presentation data and/or game situation data, etc. as well as in particular real-time communication data such as telephony data and/or video telephony data and/or streaming data, etc. The media data preferably include video and/or audio of a multi-layer codec, in particular a video codec according to H.264 SVC. The basic layer and the enhanced layer can each be content-carrying sublayers, wherein the basic layer contains at least the data required for decoding and wherein one or more enhanced layers contain data for decoding quality features of the source medium. I Network access can be any data transmission path and can also include network access points, nodes, protocols, interfaces, layers, etc. The basic layer can have priority in the allocation of network access with the best network quality and/or stability. In this case, a network access with a better network quality and/or stability than the network access allocated to the enhanced layer can be allocated to the basic layer. It is understood that steps c) and d) can be carried out prior to step b). Steps c) and d) can also be carried out repeatedly when the second network access is omitted or experiences interference or if a better network access is available. The network environment can be monitored continuously for this purpose. It should be understood that the at least one enhanced layer is transmitted via the at least one second network access. This can also mean that a single enhanced layer is divided and transmitted into multiple second network accesses, one or more enhanced layers are transmitted via a single second network access, or several enhanced layers are transmitted via multiple second network accesses, depending on requirements and capabilities of the respective network accesses.

In one preferred embodiment of this aspect of the invention, the method takes into account codec-specific parameterization of the priority for the partial layers of a codec.

In one preferred embodiment of this aspect of the invention, the method has the additional steps of:
e) determining a signal-to-noise ratio of available network access points; and
f) approximating the network quality of the available network access points by including the metrics of the determined signal-to-noise ratio.

The signal-to-noise ratio (SNR) can be defined as the ratio of the signal level to the noise level. In some embodiments, steps e) and f) can be integrated into steps c) and/or d).

In one preferred embodiment of this aspect of the invention, the method has the additional step:

g) adding a sequence number before every piece of the encoded media data prior to transmitting the piece.

Since multiple network accesses, e.g., transmission paths, can be used to transmit usage data that may also have different latencies, etc., adding the sequence number can make assembly on the receiver side easier as well.

Another aspect of the invention relates to a method for transmitting encoded media data on the basis of a layer model with the following steps:

A) receiving media data that are divided onto a basic layer and at least one additional enhanced layer, via at least one network access; and B) combining the basic layer and the at least one enhanced layer of the thus successfully transmitted layers into decodable media data.

The method in this aspect can concern the receiver side while the previous aspect concerned the transmitter side. Accordingly, the transmission method in this aspect does not need to have, but may also have, steps for transmission. Thus, the transmission method of this aspect can also generally be understood as a method for processing encoded media data. The data received according to the method in this inventive aspect are preferably data that have been provided by means of a method according to the previous inventive aspect. By combining them, the decodable data receive at least the basic layer (otherwise decoding would not be possible) and, depending on the transmission success, one or more enhanced layers.

In one preferred embodiment of this aspect of the invention, the method has the additional steps:

C) buffering received data pieces of the media data, and

D) combining the received and buffered data pieces in the correct order, preferably based on a sequence number in front of every data piece.

The method according to the preceding inventive aspect preferably provides for the at least one enhanced layer to implement one or more of the following features:

greater transmission error redundancy compared to the basic layer, greater video resolution compared to the basic layer, at least 3-dimensional video resolution, a higher image repetition rate compared to the basic layer, greater audio reception quality compared to the basic layer, and multi-channel, in particular stereo, surround or Spatial Audio reception quality.

A higher image repetition rate can also comprise the case in which a moving image can be transmitted via the enhanced layer when the basic layer has only a still image or an avatar.

Another aspect of the invention concerns an apparatus for executing the method according to one of the preceding inventive aspects. The apparatus can include a communication system, a server computer device and/or a mobile terminal. It is understood that the method or individual sections of the method can be controlled by the functional units that are implemented in the device. The functional units can be implemented on one single device or they can be distributed to several devices in any desired fashion. It is useful if functional units that concern the method of the first inventive aspect are implemented on a transmitter side, and if functional units that concern the method of the second inventive aspect are implemented on a receiver side. However, at least portions of the method of the first inventive aspect can be implemented on the receiver side and/or at least portions of the method of the second inventive aspect on the transmitter side. It should also be noted that items on the transmitting path such as routers, gateways, switching exchanges and centers, etc. can represent both sides of transmitter and receiver. Such items can also implement both aspects of the invention, and it can also be the case that one such item handles only a portion of the data pieces according to the layers that are transmitted via the respective transmission path. In some embodiments, the apparatus can include individual units that cover only one aspect of the method according to the invention, as well as individual units that cover portions or the entirety of both aspects. Some embodiments of the apparatus can be configured as a system in which portions and/or the entirety of one aspect and/or portions and/or the entirety of both aspects are distributed to multiple devices.

Embodiments of the method and apparatus can be configured to utilize existing technologies and can also improve the overall experience as perceived by the user. Techniques such as measuring the SNR and using it as a metric for assessing the network quality can be configured to allow for a more accurate approximation of the latest network quality compared to RTCP. Compared to existing approaches such as PPP Multilink, link management/QoS/Layer and combining in the receiver, the use of multiple network accesses according to the disclosure of the application can be much more flexible when transmitting encoded media data.

In some embodiments, a device (e.g. a mobile terminal device, a terminal device, a smart phone, an electronic table, a laptop computer, a personal computer, etc.) can be connected via at least one network access to a video source (e.g. a server computer device hosting a video service, etc.) that distributes all layers of a scalable video codec. Additionally measured are the availability of the network access and its current individual transport capacity, reliability and quality. This information can be output to a functional unit wherein the perceived user experience is assessed, for example via the E model according to ITU-T Recommendation G.107 by approximation to an expected mean opinion score (MOS), for example.

Embodiments of the method and apparatus can enable a different use of scalable video codecs for (mobile) devices and traversed network elements if—preferably—more than one network access with varying network conditions is available. Control of the different layers with regard to routing and transmission of the scalable video occurs automatically and during streaming without user interaction. In some embodiments, no manual configuration may be required aside from a description of the requirements for the individual media layers at the start of the communication and final guidelines for traffic handling.

Embodiments of the method and apparatus can be particularly advantageous in a mobile scenario when using a smart phone or other mobile terminal device. The embodiments can also enable video streaming using a scalable codec, make use of detailed information via the specific requirements of the enhanced layers, and also can enable an approximation of the quality of a different subset of available enhanced layers as perceived by a user. Embodiments of the method and apparatus can also be configured to determine or use information about the availability of the network accesses and their current and actual transport capacity, reliability and quality. This can be made possible for wireless access in some embodiments through band-internal spectral measurements and awareness of the correlation of spectral measurements and capabilities. Functional units such as a decision manager or a transport-aware layer can proactively generate a forwarding behavior on the basis of this information. Additionally, different transport capabilities (e.g., reliable transport, error correction and prioritization) can be selected on the basis of the importance of the different enhanced layers. Support for the different quality of service (QoS) classes for the specific enhanced layers is also possible based on the network capabilities.

An automatic control mechanism for these layers can be provided in embodiments of the method and apparatus based on actual network conditions, e.g. network availability and network properties. Respective methods for transmitting encoded media data on the transmitter and receiver sides, or a combination of these methods, respective devices for executing one of the methods and a system for executing the method(s) can each be utilized to provide such a control mechanism.

The invention can also be embodied by a computer program comprising program commands that cause a computer device (e.g. a terminal device or a server computer device) to carry out the method sequences of at least one of the described methods when the computer program is installed or running on the device, by a software product that is stored on a tangible, non-transitory computer-readable medium and can preferably be installed directly into the internal memory of a computer and that has program codes for carrying out the method sequences of at least one of the described methods when the computer program runs on the computer, and/or by a tangible, non-transitory digital storage medium having electrically readable control signals that can operate with a programmable computer in order to manage communication processes, wherein the control signals are designed and adapted to cause the computer to carry out the process steps of at least one of the described methods.

Additional features, tasks, advantages and details of the present invention will become more apparent from the following description of concrete exemplary embodiments and their presentation in drawings in the included figures. It is understood that features, tasks, advantages and details of individual exemplary embodiments are transferrable to other exemplary embodiments and are considered to be disclosed also in connection with the other exemplary embodiments unless this is obviously inapplicable for technical or physical reasons. Accordingly, features of various exemplary embodiments can fundamentally be combined with other exemplary embodiments and the combination can also be considered an exemplary embodiment of the invention.

BRIEF DESCRIPTION OF THE DRAWINGS

The invention is described below in more detail based on preferred exemplary embodiments and with reference to the figures. It should be appreciated that like reference numbers used in the drawings may identify like components.

The figures are schematic presentations and not necessarily according to scale. The illustrations in drawings and the descriptions thereof shall be considered exemplary illustrations of the principle of the invention and shall in no way restrict the invention. The figures are:

FIG. 2A illustrates a sequence diagram illustrating a first set of steps of the first exemplary embodiment of the method, FIG. 2B illustrates a sequence diagram illustrating a second set of steps of the first exemplary embodiment of the method, and FIG. 2C illustrates a sequence diagram illustrating a third set of steps of the first exemplary embodiment of the method.

FIG. 3A illustrates a sequence diagram illustrating a first set of steps of the second exemplary embodiment of the method, FIG. 3B illustrates a sequence diagram illustrating a second set of steps of the second exemplary embodiment of the method, and FIG. 3C illustrates a sequence diagram illustrating a third set of steps of the second exemplary embodiment of the method.

DETAILED DESCRIPTION OF EXEMPLARY EMBODIMENTS

Figure 1:
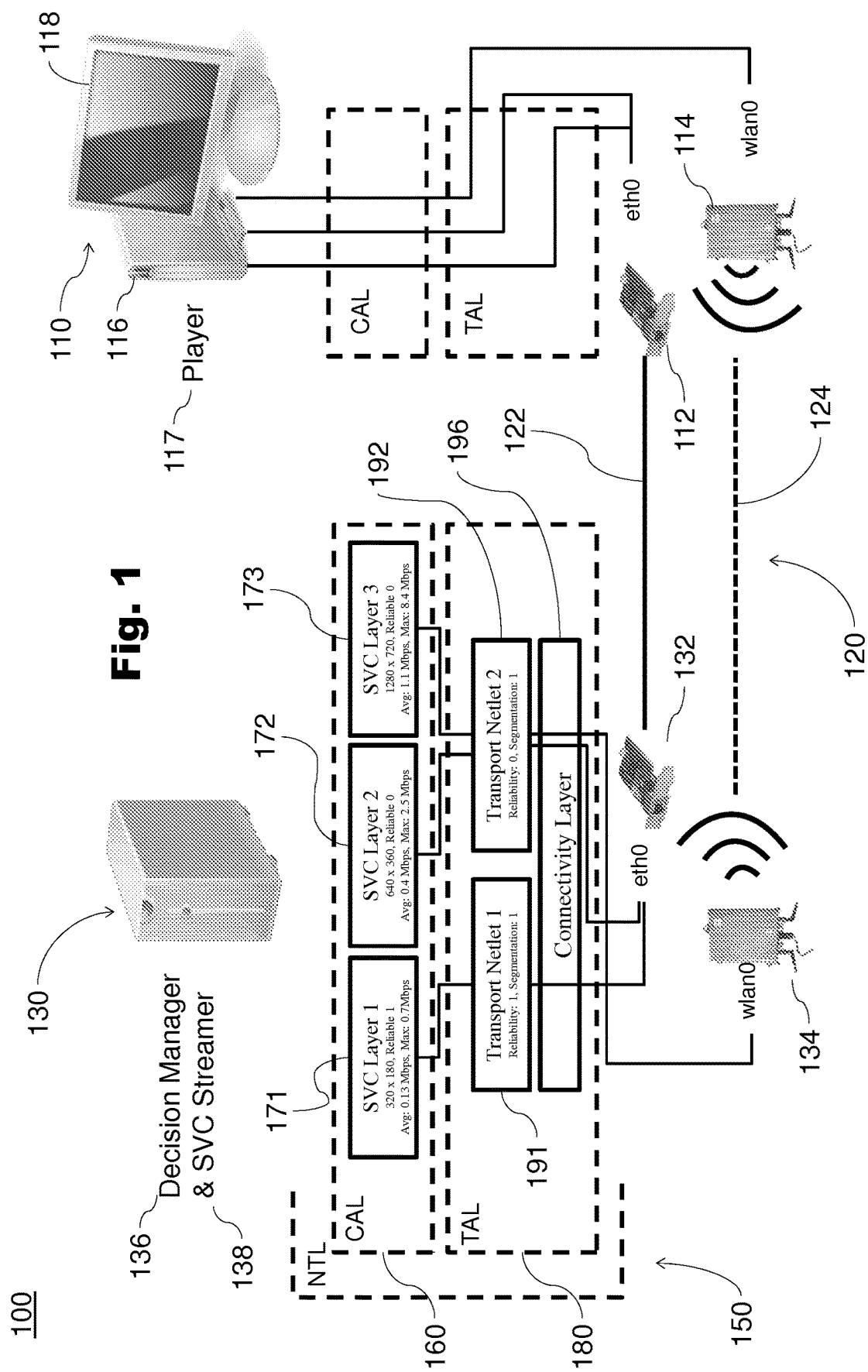
FIG. 1 is a schematic block diagram of a system according to the present invention.

FIG. 1 shows a schematic block diagram of a communication system 100 according to one embodiment of the present invention. In the communication system 100, a terminal 110 is connected to a server 130 via a network environment 120. The terminal 110 can have a network card 112 as well as a radio interface (not shown in detail) that has established a radio connection using a wireless local area network (WLAN) connection point 114 at the terminal. On the other hand, the server 130 has a network card 132 as well as a radio interface (not shown in detail) that has established a radio connection using a WLAN connection point 134 at the server side. The network environment 120 has a wired network such as Ethernet (eth0) 122 and a radio network such as WLAN (wlan0) 124.

The terminal 110 is associated with a user (not shown in detail) and is able to reproduce multimedia content. The terminal 110 can include hardware, such as a processor that is communicatively connected to non-transitory memory and at least one transceiver unit. The terminal 110 in the example shown has a computer unit 116 having a reproduction application (player) 117 and is connected to a screen 118. In this example, the computer unit 116 is configured as a compact workstation, but the invention is not restricted to this. The computer unit 116 can also be configured as a laptop computer, tablet computer, smartphone, game console, as part of a HiFi system or in any other suited manner. The computer unit 116 can have an integrated screen such that it does not need to rely on the external screen 118 for reproducing media data.

The server 130 is located at a distance from the terminal 110. The server 130 can be a server computer device that includes hardware, such as a processor that is connected to non-transitory memory and at least one transceiver unit. The server computer device 130 can include a decision manager 136 and an SVC streamer application 138 each of which can be implemented through software and/or hardware (e.g. be an application that is stored in memory that is executable by a processor for implementing a method defined by the application). The decision manager 136 and the application 138 can also be designated as functional units or as functional items either each by itself or in cooperation. The SVC streamer 138 is an example of a multimedia application and will be designated in short as application 138 (also "composite application" in FIGS. 2A to 3C).

The terminal 110 is thus connected to the server 130, serving as a video source, via multiple network accesses 122, 124. The server 130 distributes all layers of a scalable video codec (SVC). The SVC provides, for example, a basic layer and two additional sublayers, which are also designated as enhanced layers (enhanced layer #1, enhanced layer #2 in FIGS. 2A, 3A). Additionally measured are the availability of the network access and its current individual transport capacity, reliability and quality. This information is distributed to a functional unit, wherein the perceived user experience is assessed, for example via the E model according to ITU-T Recommendation G.107 by approximation to an expected mean opinion score (MOS), for example.

For data transmission, a network-tolerant layer (NTL) 150 can be used. Details and explanations of the structure of the NTL 150, its sublayers and their implementation are contained in a German patent application No. 10 2014 006 038.1. The entirety of this German patent application and the U.S. patent application filed in 2015 claiming priority to that German patent application is incorporated by reference herein. Provided in the architecture of the network-tolerant layer NTL 150 are two interacting sublayers, which here are also designated as functional layers, an object model with adaptive bindings and a control item. As shown in FIG. 1, a content-aware layer (CAL) 160 is provided as an "upper" sublayer of the NTL 150 and a transport-aware layer (TAL) 180 as a "lower" sublayer of the NTL 150. The TAL 180 is provided to carry data transport capabilities via heterogeneous networks, while the CAL 160 is provided to adapt the transmitted data content according to the context of mobile devices. TAL 180 and CAL 160 can also be understood as functional units.

According to the illustration in FIG. 1, three layers of a scalable video codec (SVC) are available at the level of the CAL 160, namely a first SVC layer 171, a second SVC layer 172 and a third SVC layer 173, which can be used selectively or additively. According to the information in FIG. 1, the SVC layers 171, 172, 173 differ from each other in their image resolution, their reliability (reliable) and their mean (avg) and maximum (max) transmission rate. Two transport netlets 191, 192, which can be used selectively or additively, and a connectivity layer 196 are available at the TAL 180 level. The transport netlets 191, 192 differ from each other by their degree of reliability and possibly also their segmentation value. The connectivity layer 196 controls a network access by establishing a connection with both the server-side network card 132 and—via the radio interface (not shown in detail)—the server-side WLAN connection point 134. The connectivity layer 196 corresponds to the multiple network access of the Sillberg architecture and differs from the network access layer. The connectivity layer 196 is linked upwards with the two transport netlets 191, 192. The first transport netlet 191, having a high degree of reliability (1), is connected beyond the sublayer boundaries to the first SVC layer 171, which also has a high reliability (1), and via the connectivity layer 196 to the network card 132 of the server 130. The second transport netlet 192, having a low degree of reliability (0), is connected beyond the sublayer boundaries to the second SVC layer 172 and the third SVC layer 173, which also have a low degree of reliability (0), and via the connectivity layer 196 to both the network card 132 of the server 130 and the server-side WLAN unit 134. In some embodiments, the first transport netlet 191 having or demanding a high degree of reliability may not be connected via the WLAN network wlan0.

On the transmitter side (server 130), the CAL 160 receives the encoded layered/multidescriptive data stream from application 138. The CAL 160 has exact technical information on the application 138 and on the used codecs, as well as the influence that the individual layers/descriptions have on the quality as perceived by the user. The CAL 160 identifies and separates the different layers/descriptions by examining the encoded stream. Via one of the respective SVC layers 171, 172, 173, the separated streams or aggregates are transferred to the TAL 180 piece-by-piece together with meta information that describes the importance of and the requirements for the transferred data. The TAL 180 is thus capable of dynamically adapting the number of transmitted layers/descriptions based on the available network accesses 132, 134 and the total available bandwidth. Furthermore, the distribution of layers/descriptions of high importance can be ensured by using additional protective mechanisms such as re-transmission or forward error correction. Additional mechanisms are provided based on the separation of layers/descriptions of the application data in order to allow for synchronization of the data streams on the receiver side so as to forward a valid data stream to the application. This can be achieved by adding an additional sequence number before every piece in the stream to the TAL 180.

An additional buffer is provided on the receiver side (terminal 110) to allow for synchronization of the separated data streams and for forwarding of a valid application layer data stream. This can be the same data stream provided by the transmitting application 138 but can also be a data stream in which parts of layers or entire layers are missing, either due to network overload or due to decisions in the TAL 180. Some embodiments can be configured to use a new sequencing buffer that re-sorts the data stream based on the sequence numbers of the data pieces. Since this buffer introduces an additional delay, it is dimensioned with regard to application and network parameters.

Splitting of the video data stream in the functional unit (decision manager 136, TAL 180, possibly CAL 160) as well as combination and synchronization in the receiver (terminal 110) will be described in detail below based on a sequence diagram of an exemplary embodiment shown in several successive parts in FIGS. 2A to 2C.

Figure 2A:
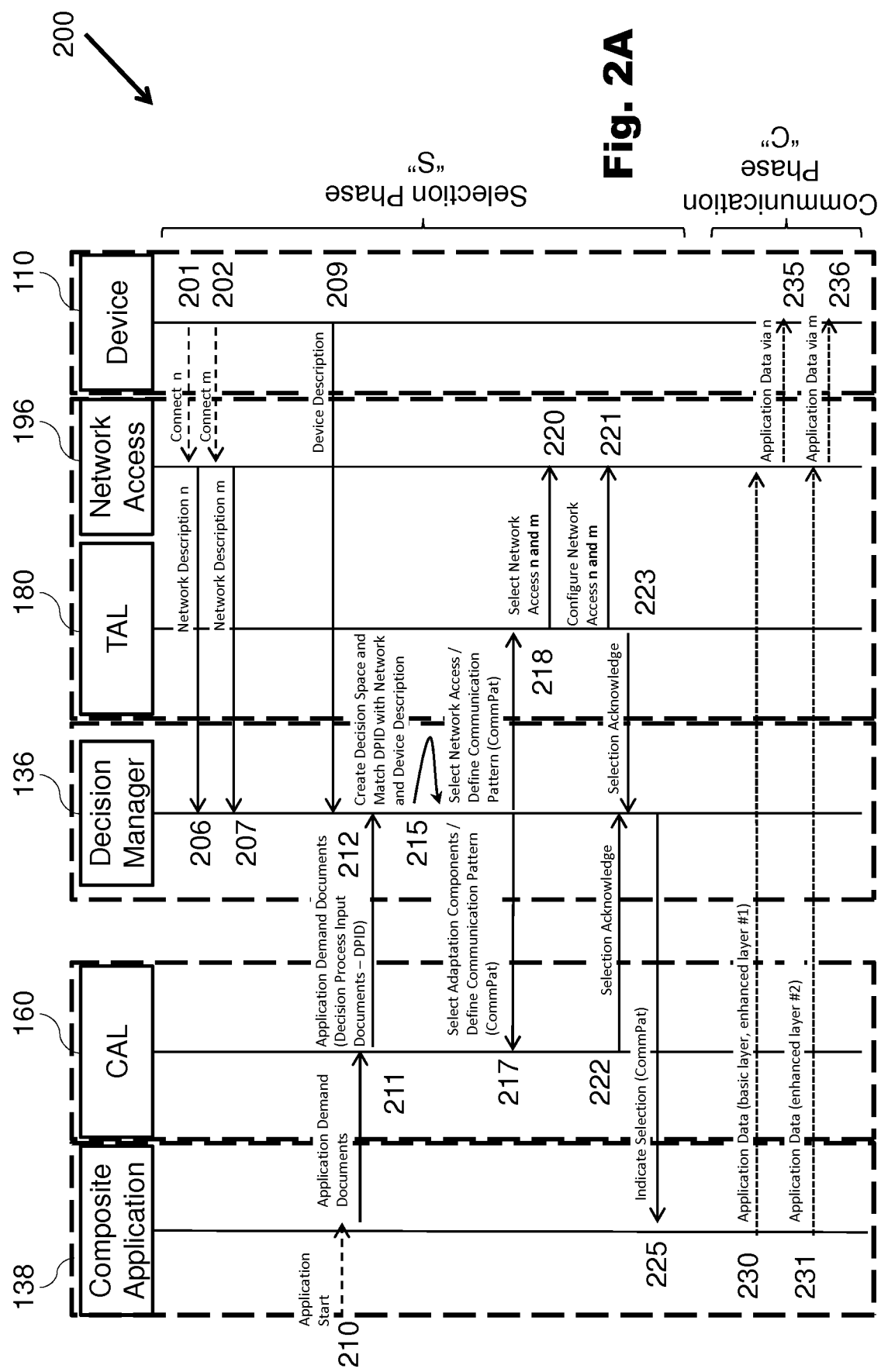
FIGS. 2A to 2C illustrate successive sections of a sequence diagram for illustrating a first exemplary embodiment of the method, where.
Figure 2B:
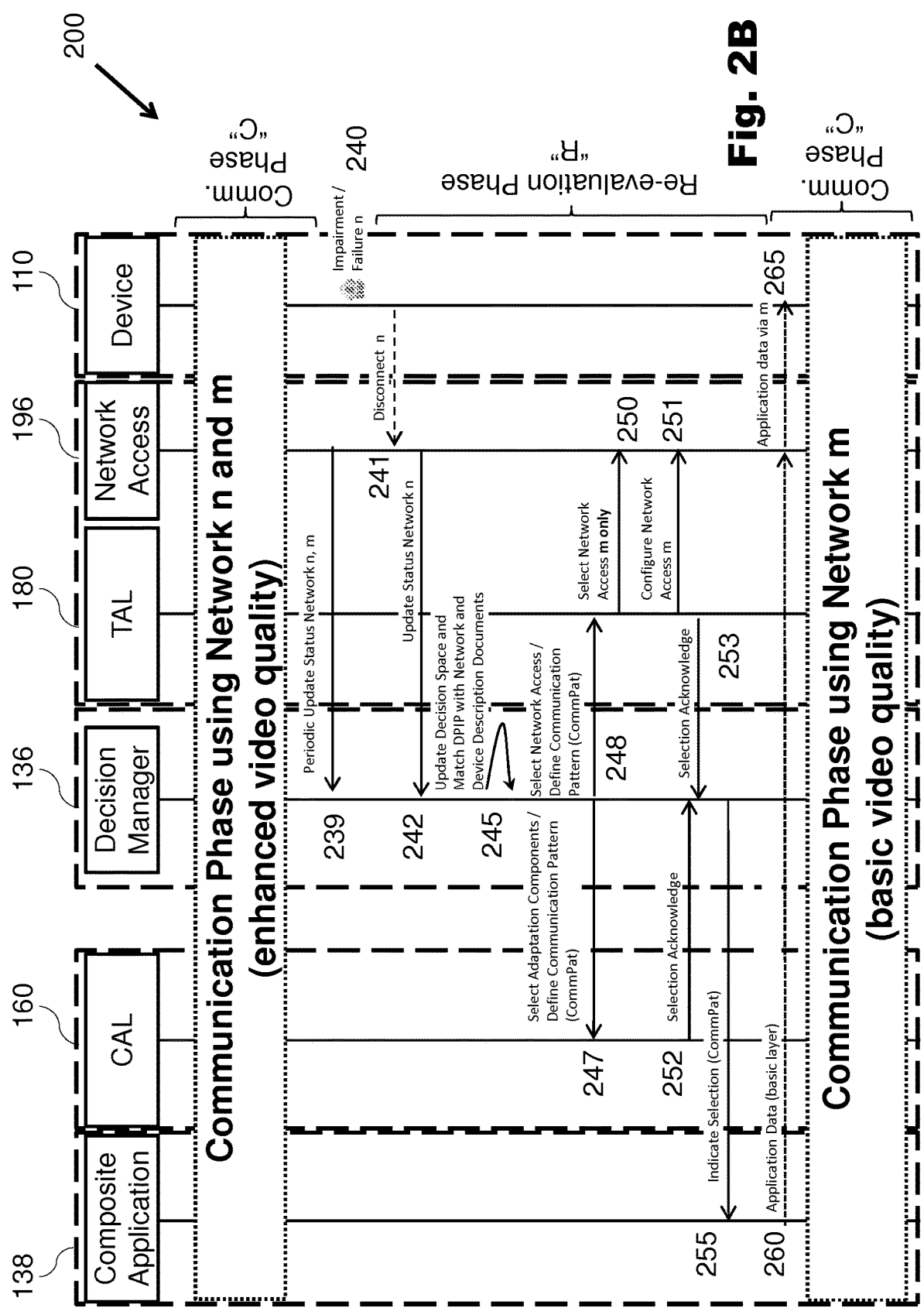
Figure 2C:
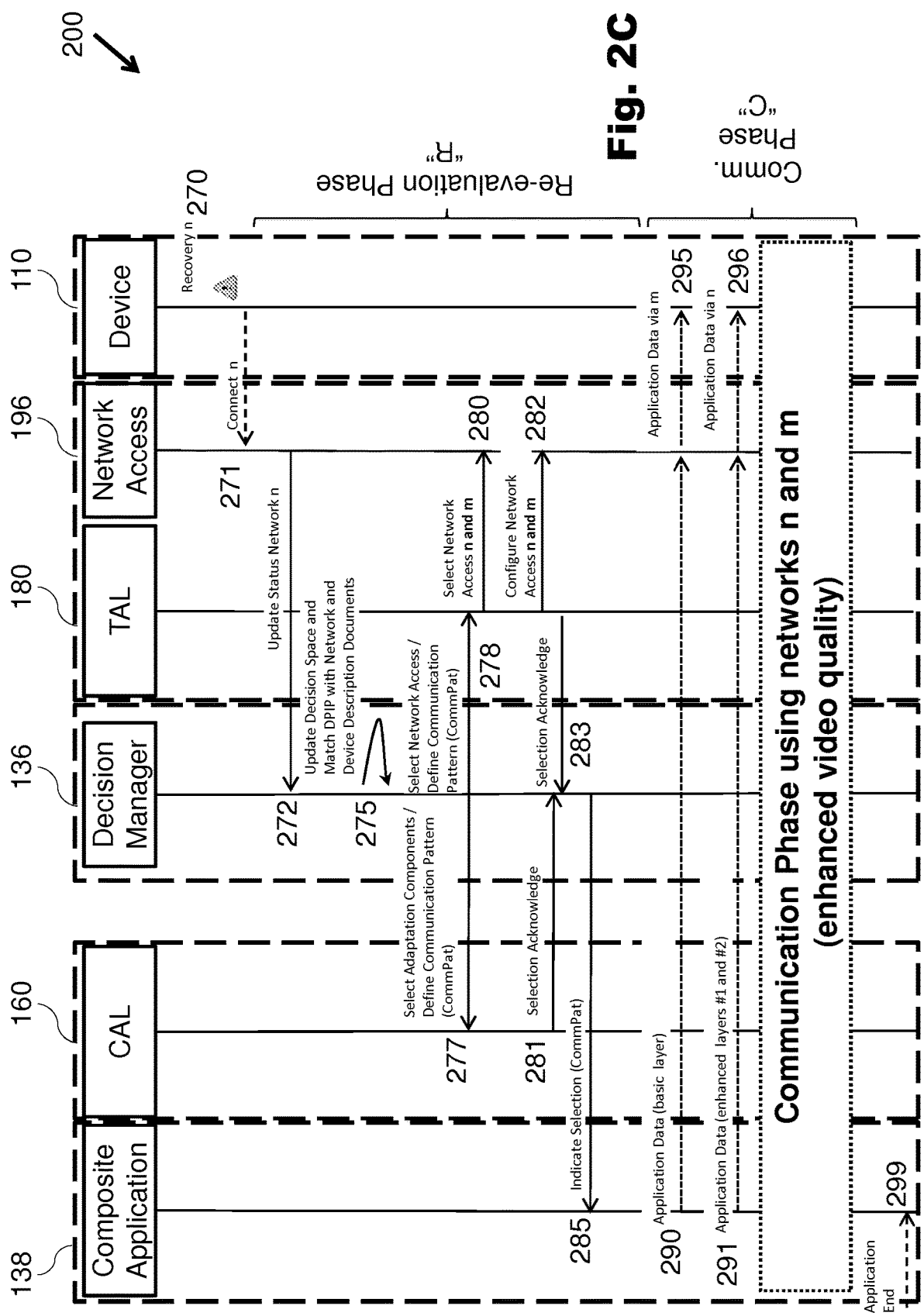

FIGS. 2A to 2C show a process 200 according to the invention according to one embodiment based on a sequence diagram in three successive sections. In other words, the section of the process 200 shown in FIG. 2A is followed by the section shown in FIG. 2B, and the section shown in FIG. 2B is followed by the section shown in FIG. 2C. The processing sequence is always from top to bottom.

The previously mentioned components of the NTL architecture and their partial layers are presented as entities or items. It is assumed that two network accesses n, m, are available. As shown in FIG. 1, the connections terminate via 122, 124 at the interfaces 112, 114.

Process 200 starts with a selection phase "S". Initially, the device 110 connects with the connectivity layer 196 (steps 201, 202). The connectivity layer corresponds to the multiple network access of the Sillberg architecture. "Network access" means multiple network access. It passes this information on to the decision manager 136 (steps 206, 207) together with information about the available network accesses n, m. The terminal 110 itself transmits a description of its own capabilities, requirements and parameters directly to the decision manager 136 (step 209). After the application starts (step 210) and transfers its requirements (step 211), they are passed on from the CAL 180 to the decision manager 136 (step 212). The latter compares the requirements of the application with those of the network accesses (step 215) and selects from among them a few usable communication patterns and transmits them to both cooperating NTL sublayers CAL 160 and TAL 180 (steps 217, 218). As an example, TAL 180 now selects the network accesses n and m (step 220) and configures them (step 221). After confirming the selection (steps 222, 223), the application 138 receives the communication pattern being used (step 225).

The communication phase "C" begins thereafter, and the application 138 starts by transmitting the usage information (steps 230, 231). The connectivity layer 196 distributes this information accordingly over the network accesses n and m (steps 235, 236). Since both network accesses n and m are available, the application data can be distributed across a basic layer and two enhanced layers (enhanced layer #1, enhanced layer #2) and therefore can be transmitted with enhanced video quality. The communication phase C using network access n and m is therefore a communication phase with enhanced video quality, see FIG. 2B from this point on.

During the communication phase C, the connectivity layer 196 continuously updates the network status repeatedly as shown in FIG. 2B and transmits it to the decision manager 136 (step 239).

The terminal 110 detects an interference or quality deficiency of the network interface n via interface monitoring (step 240). This triggers a re-evaluation phase "R" which starts with the terminal 110 turning off the network interface n (step 241). The connectivity layer 196 transmits thereupon an update of the network status to the decision manager 136 (step 242). The latter evaluates the current situation (step 245) and now transmits possible communication patterns to the cooperating NTL sublayers CAL 160 and TAL 180 (steps 247, 248). The TAL 180 now selects only network access m (step 250) and configures it (step 251). After confirming the selection (steps 252, 253), the application 138 receives the communication pattern being used (step 255) and starts a new communication phase "C" by transmitting the usage information (step 260), whereupon the connectivity layer 196 distributes this information correspondingly via network access m (step 265). Since only network access m is still available, the application data can only be transmitted via the basic layer and thus only with basic quality. Therefore, the communication phase C using only network access m is a communication phase with basic video quality.

After a while, as now shown starting in FIG. 2C, network access n is stable again (step 270) and the device (terminal) 271 connects in a now triggered re-evaluation phase "R" again via this interface (step 271). It again communicates the connectivity layer 196 to the decision manager 136 (step 272). The latter evaluates the current situation (step 275) and reestablishes the original utilization of the connectivity via network accesses n and m based on its awareness (steps 277 to 283 and 285, which in content correspond to steps 217 to 223 and 225, such that a renewed explanation can be omitted at this point). The further course of the method now corresponds again to the communication phase "C" with increased video quality (steps 290-291 and 295-296, which in content correspond to steps 230-231 and 235-236, such that a renewed explanation can also be omitted at this point). The Process 200 ends with the end of the application 138 (step 299).

Figure 3A:
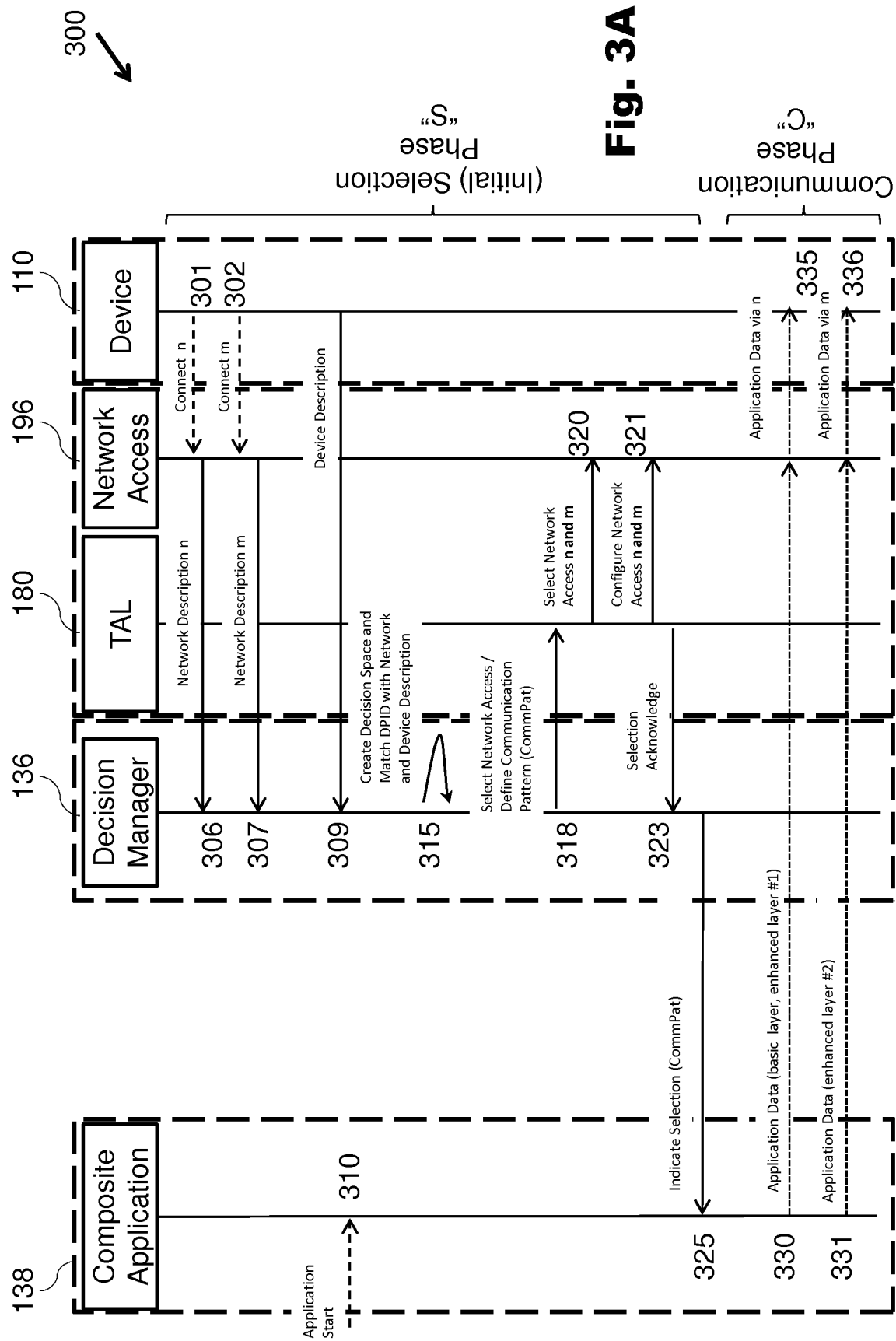
FIGS. 3A to 3C illustrate successive sections of a sequence diagram for illustrating a second exemplary embodiment of the method, where.
Figure 3B:
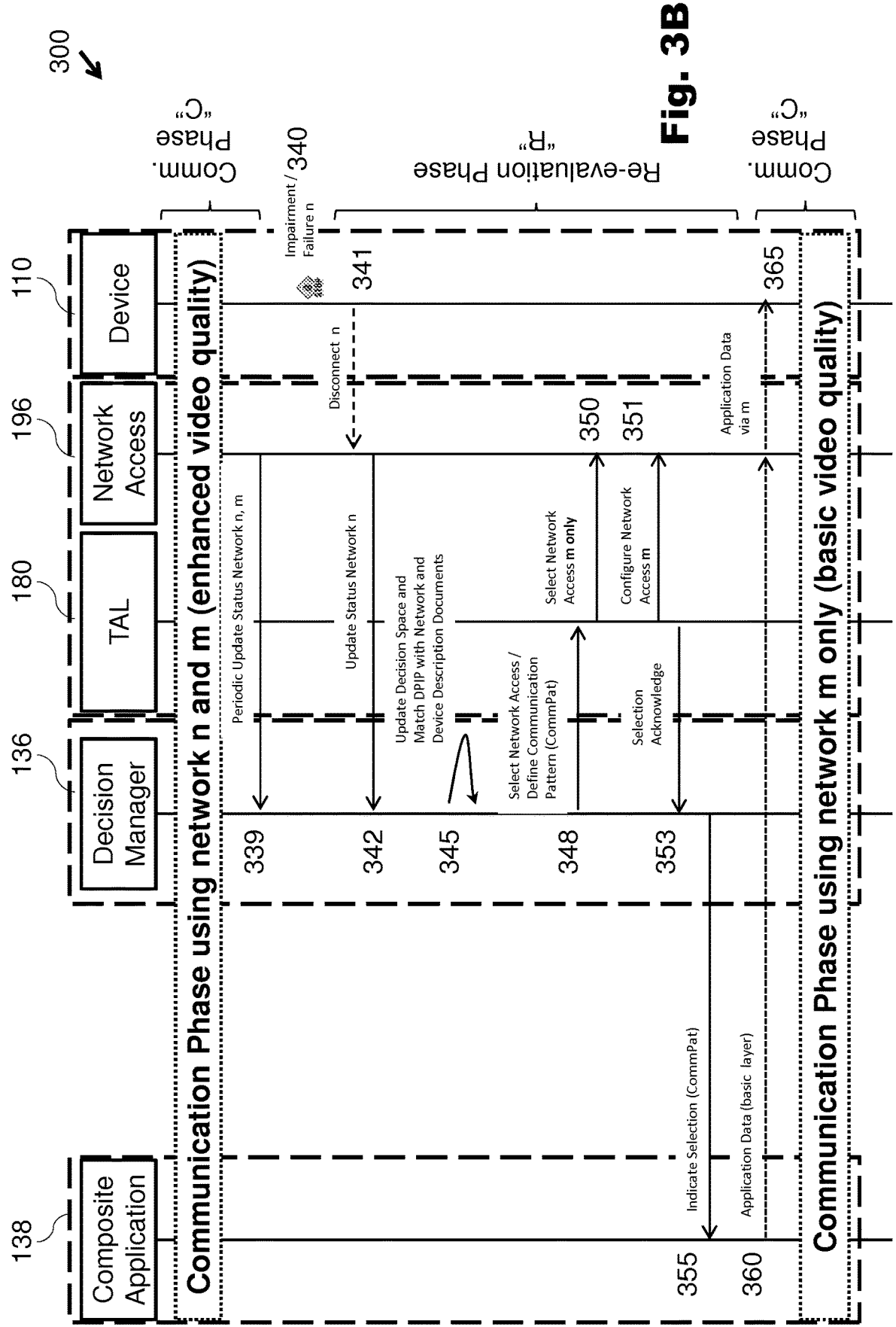
Figure 3C:
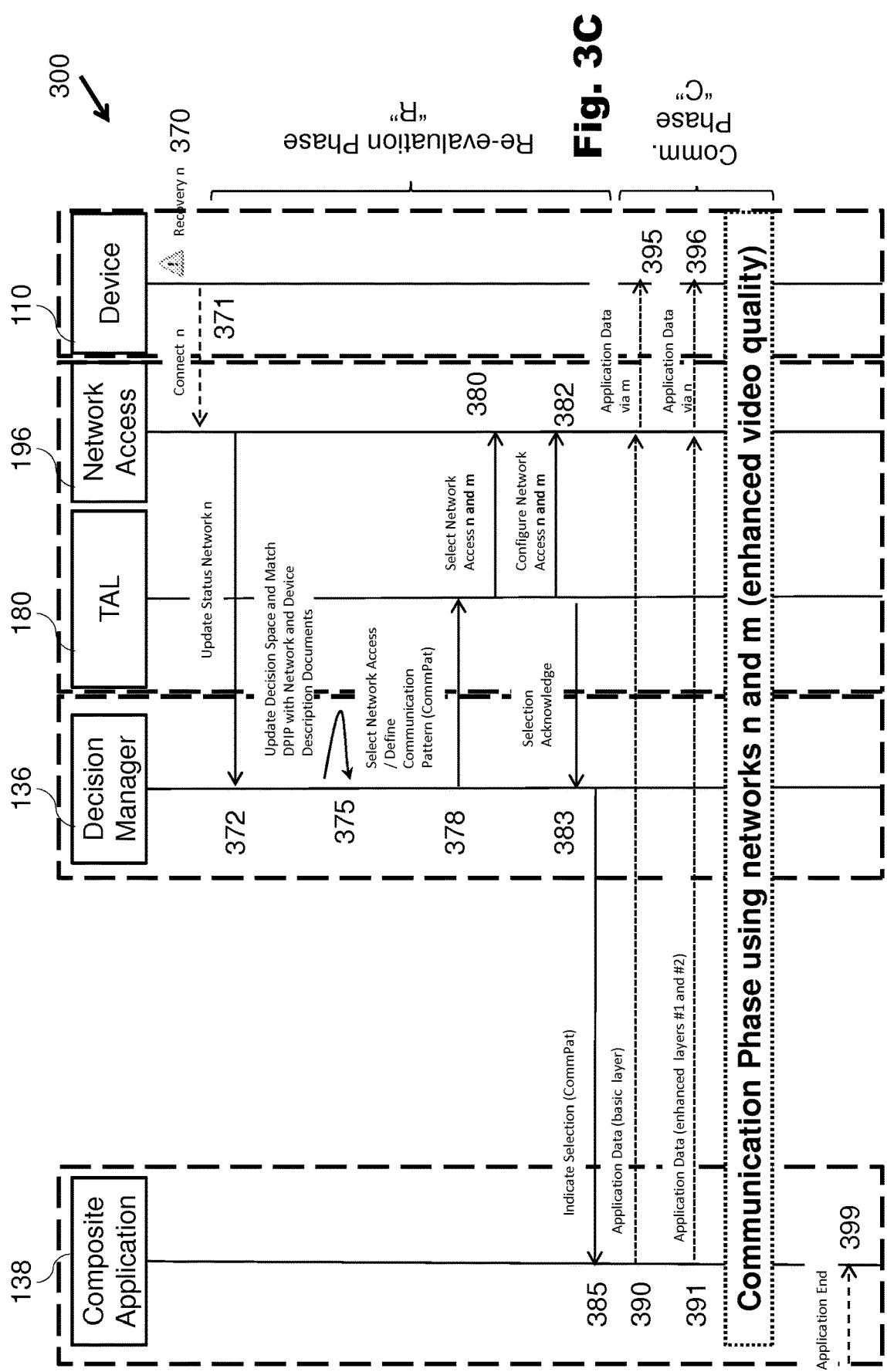

FIGS. 3A to 3C show a process 300 according to the invention, according to another embodiment based on a sequence diagram in three successive sections. In other words, the section of the process 300 shown in FIG. 3A is followed by the section shown in FIG. 3B, and the section shown in FIG. 3B is followed by the section shown in FIG. 3C. The processing sequence is always from top to bottom.

The Process 300 according to the presentation in FIGS. 3A to 3C differs from the process 200 shown in FIGS. 2A to 2C in that no content-aware layer CAL is provided in the previous embodiment. All process steps 3xx starting with the numeral "3" correspond in content to the process steps 2xx of the process 200 shown in FIGS. 2A to 2C, so to avoid, full reference is made to the content of the corresponding description. However, since the content-aware layer CAL is missing in the embodiment of FIGS. 3A to 3C, those steps relating to CAL are omitted in the process 300; thus, the embodiment of FIGS. 3A to 3C has no equivalents to steps 211, 212, 217, 222, 247, 252, 277, and 282 of the embodiment illustrated in FIGS. 2A to 2C. The decision process input documents (DPIDs) can be defined corresponding to steps 211, 212 (FIG. 2A) through a functional unit such as the application or the decision manager. The DPIDs are the generic requirement documents of the application and of the transport property documents as well as the device property documents. All together, the DPIDs form the decision space from which the decision manager performs the best possible adjustment between requirement and transport capabilities with optional use of policies.

It is understood that when applying this embodiment, the CAL 160 needs to be imagined as being absent in FIG. 1 The functionality of the CAL provided in abstract fashion can be integrated into the application, for example the media streaming H.265 SVC.

It is further understood that the invention is not restricted to the two network types Ethernet and WLAN.

It is also understood that the application 138, which as shown in FIG. 1 is anchored in the server 130 and according to FIGS. 2 A to 3 C executes the process or the processing steps on the server side, can also be distributed to one server and one terminal or implemented only in one terminal. In this regard, parts of the SVC streaming application 138 of the server 130 can also be implemented in the application of a terminal such as the terminal 110.

By using more than one network access at the same time, e.g. fixed and WLAN network, fixed and cellular (HDSP, UMTS, LTE, . . .), or WLAN and cellular, the functional unit according to this invention also has the flexibility to route or reroute the different layers of the scalable video codec via different network accesses, according to the current network conditions and guidelines, in order to handle the traffic. As a result, the functional unit is aware of the minimum requirements for transmitting the different SVC layers as well as the transport guidelines used and matches them to the actual network conditions in accordance with the spectral measurements in the band for available wireless network accesses. Based on this match, it also determines how many (dependent) layers are transmitted to the endpoint and whether additional mechanisms for error correction are required.

Embodiments of the method and apparatus can provide advantages when only a single network access is available or present, since additional layers can be suspended in the event of determined lacking network quality and the associated small usable bandwidth. The prior art is based on reactive adaption of the application quality without awareness of the actual network condition. The adaptions are correspondingly sluggish. The condition of the network connection can be better assessed by adding the spectral measurements and also not using the new metrics of the SNR, which can allow for a targeted adaption of the application quality and the transport properties.

The functional unit can be informed immediately about changes in the actual network conditions and examines its decisions accordingly. As a result, the loss, recovery or instability of a network access point assumes priority over network quality indications. Depending on the concrete network configuration, the functional unit—as disclosed in this application—can preferably be employed on a media server, a video conferencing server or, if different (administrative) network domains are covered, a "traversal using relays around NAT" (TURN) server, a "session border controller" (SBC), a combined access router/application layer gateway (ALG) or a "media-aware network element" (MANE). On the other hand, with the growing processing power of (mobile) devices, e.g., through multi-core technologies, the functional unit can also be integrated into the device, which uses the technology for interactive video or video upload of a previously recorded video as disclosed in this application. Since the functional unit that is inherent in the network elements, as mentioned above, can include an overview of the actual overall traffic situation, it can also take into account load balancing in order to provide appropriate utilization of network resources across the connection devices.

Embodiments of the method and apparatus can be configured so that awareness of application content and requirements (as provided by CAL) and network properties (as provided by network monitoring or observation) can be used in order to adapt the transport services of the TAL. Transport protocols can be selected on the basis of properties and current conditions of the network access used and the requirements of the application for a specific flow. An adaption of transport services can include a fine-grained selection of protocol mechanisms such as resorting, retransmission, congestion control or forward error correction (FEC) so that the optimal combination of transport service and network access can always be selected for a particular application subflow without involving the application in the decision-making process. The additional network intelligence can result in a better overall user experience without the need to reserve QoS resources within the network, which nowadays is not available in current public networks. However, it may not require monitoring the network quality of the respective network access, which can be provided by protocols similar to the RTCP and/or local SNR measurements.

Video streaming using the H.264/SVC codec can allow an adaption of the already encoded video stream with regard to the available network resources. One or more layers can be dropped in part or entirely, which leads to a lower replay quality, resolution or image frequency. Even though the quality perceived by the user is reduced, there are no undesired interferences such as artifacts, freezing or jumping. Together with information about the influence of such adaptions on the quality perceived by the user, video replay can be optimized with regard to the network conditions. Important layers of the video stream such as the basic layer, which must be transmitted error-free to play back the video, can be protected using additional mechanisms such as FEC or packet retransmission. A script that allows the separation of the individual layers is implemented on the basis of Annex G of the H.264/SVC Standard [H264] "Advanced video coding for generic audiovisual services". A sequence number is inserted before the application header of each frame within each layer to enable synchronization on the receiving side. The separated streams are then transferred to the transport-aware layer TAL 180, for which the open source software NENA can be used in this example. The netlet-based node architecture (NENA—<http://nena.intend-net.org> http://nena.intend-net.org) can be configured as a runtime network that allows nodes to link with or connect to several networks simultaneously. These networks can be based on different protocol families that use specialized network protocols.

Applications can access these protocols via an application program interface (API) that abstract from details of the network operation: Instead of providing network addresses and protocols, applications specify globally unique names as URIs and requirements to the queried communication service in order to initiate communication with the content, service or network host that is associated with the name. Protocols or complete protocol stacks in NENA are encapsulated in so-called netlets. The "netlet selection" component performs the selection of networks and netlets using the requested names and application requirements as selection criteria. A multiplexer forms the basic layer of a protocol family, performs netlet multiplexing and implements—dependent upon the family—addressing and transfer mechanisms. Network accesses represent a physical or logical network interface card. Thus, multiplexing of multiple virtual networks must be performed via the same physical network outside of NENA.

The procedures that have been explained in connection with embodiments of the invention described herein can also be applied to scalable and multi-description codecs and enhanced layers of video and audio codecs. The features of the invention described with respect to the embodiments shown can also exist in other embodiments of the invention, except when stated otherwise or when impossible for technical reasons. While certain exemplary embodiments of a communication apparatus, communication system, and methods of making and using the same have been shown and described above, it is to be distinctly understood that the invention is not limited thereto but may be otherwise variously embodied and practiced within the scope of the following claims.

What is claimed is:

1. A method for transmitting encoded media data via a computer device comprised of hardware, the hardware comprising a processor and non-transitory memory, the method comprising:

the computer device examining encoded media data to separate different portions of the encoded media data into a first encoded media data stream and a second encoded media data stream for transmission to a terminal device and separating the encoded media data into the first and second encoded media data streams;

the computer device generating meta data to transmit with the first encoded media data stream and the second encoded media data stream, the meta data identifying at least one of (i) an importance level and (ii) a description to facilitate dynamic adaptation of how the first and second encoded media data streams are transmittable to the terminal device, wherein a first network access to a first network is utilizable to transmit the first encoded media data stream to the terminal device based on requirements of the first encoded media data stream and availability of network accesses for transmission of data between the computer device and the terminal device and a second network access of a second network is utilizable to transmit the second encoded media data stream to the terminal device based on requirements of the second encoded media data stream and availability of network accesses for transmission of data between the computer device and the terminal device;

evaluating a first status of connectivity between the computer device and the terminal device; and in response to determining that connectivity between the computer device and the terminal device has changed, ceasing transmission of the second encoded media data stream via the second network access so that transmitting of the first encoded media data stream from the computer device to the terminal device continues while transmission of the second encoded media data stream from the computer device to the terminal device is stopped.

2. The method of claim 1, comprising:

evaluating a second status of connectivity between the computer device and the terminal device after transmission of the second encoded media data stream from the computer device to the terminal device via the second network access is stopped; and in response to determining that connectivity between the computer device and the terminal device has changed based on the evaluating of the second status of connectivity, resuming transmission of the second encoded media data stream via the second network access so that transmitting of the first encoded media data stream from the computer device to the terminal device and transmission of the second encoded media data stream from the computer device to the terminal device occurs simultaneously via the first and second network accesses.

3. The method of claim 2, comprising:

determining a signal-to-noise ratio of available network access points; and approximating network quality of the available network accesses by including metrics of the determined signal-to-noise ratio.

4. The method of claim 3, comprising:

adding a sequence number before every piece of encoded media data prior to the transmission of that piece of the media data for the first encoded media data stream and for the second encoded media data stream.

5. The method of claim 1, comprising:

the terminal device receiving the first encoded media data stream and the second encoded media data stream via the first network and the second network prior to the ceasing of the transmission of the second encoded media data stream;

the terminal device combining the first encoded media data stream and the second encoded media data stream for decoding of the first and second encoded media data stream prior to the ceasing of the transmission of the second encoded media data stream;

the terminal device receiving the first encoded media data stream via the first network and decoding the first encoded media data stream after the ceasing of the transmission of the second encoded media data stream and prior to the resuming of the transmission of the second encoded media data stream;

the terminal device receiving the first encoded media data stream via the first network and receiving the second encoded media data stream via the second network and combining the first encoded media data stream and the second encoded media data stream for decoding of the first and second encoded media data streams after the resuming of the transmission of the second encoded media data stream.

6. The method of claim 5, comprising:

buffering received data pieces of the first and second encoded media data stream, and combining the received and buffered data pieces in a sequential order based on a sequence number included with each of the received data pieces.

7. The method of claim 1, wherein the second encoded media data stream transmitted via the second network provides for at least one of:

greater transmission error redundancy compared to the first encoded media data stream transmitted via the first network;

greater video resolution compared to the first encoded media data stream transmitted via the first network;

at least 3-dimensional video resolution, a higher image repetition rate compared to the first encoded media data stream transmitted via the first network;

greater audio reception quality compared to the first encoded media data stream transmitted via the first network; and multi-channel reception quality.

8. A communication apparatus comprising:

a computer device communicatively connectable to at least a first terminal device, the computer device having at least one processor connected to non-transitory memory, the computer device configured to:

examine encoded media data to separate different portions of the encoded media data into a first encoded media data stream and a second encoded media data stream for transmission to the first terminal device and separating the encoded media data into the first and second encoded media data streams;

generate meta data to transmit with the first encoded media data stream and the second encoded media data stream, the meta data identifying at least one of (i) an importance level and (ii) a description to facilitate dynamic adaptation of how the first and second encoded media data streams are transmittable to the first terminal device, wherein a first network access to a first network is utilizable to transmit the first encoded media data stream to the first terminal device based on requirements of the first encoded media data stream and availability of network accesses for transmission of data between the computer device and the first terminal device and a second network access of a second network is utilizable to transmit the second encoded media data stream to the first terminal device based on requirements of the second encoded media data stream and availability of network accesses for transmission of data between the computer device and the first terminal device;

evaluate a first status of connectivity between the computer device and the first terminal device; and cease transmission of the second encoded media data stream via the second network access so that transmitting of the first encoded media data stream from the computer device to the first terminal device continues while transmission of the second encoded media data stream from the computer device to the first terminal device is stopped in response to determining that connectivity between the computer device and the first terminal device has changed.

9. The communication apparatus of claim 8, wherein the computer device is also configured to:

evaluate a second status of connectivity between the computer device and the first terminal device after transmission of the second encoded media data stream from the computer device to the first terminal device via the second network access is stopped; and resume transmission of the second encoded media data stream via the second network access so that transmitting of the first encoded media data stream from the computer device to the first terminal device and transmission of the second encoded media data stream from the computer device to the first terminal device occurs simultaneously via the first and second network accesses in response to determining that connectivity between the computer device and the first terminal device has changed based on evaluation of the second status of connectivity.

10. The communication apparatus of claim 8, wherein the computer device has a decision manager that is configured to select the first network and select at least the second network.

11. The communication apparatus of claim 8, wherein the computer device is configured to identify capabilities, requirements, and parameters of the first terminal device for the transmission of the first and second encoded media data to the first terminal device and select the first network access to the first network and the second network access to the second network for transmission of the first and second encoded media data to the first terminal device based on the capabilities, requirements and parameters of the first terminal device.

12. The communication apparatus of claim 11, comprising the first terminal device, the first terminal device configured to communicate with the computer device to identify the capabilities, requirements, and parameters of the first terminal device to the computer device.

13. The communication apparatus of claim 11, wherein the computer device is configured to determine that an error occurs during transmission of the encoded first and second media data streams from the computer device to the first terminal device, the error comprising at least one of an interference, a failure, and a quality deficiency for at least one of the first network and the second network to detect the first status of connectivity.

14. The communication apparatus of claim 13, wherein the computer device is configured so that when the error is determined to have occurred in the second network the computer device selects the first network as the only network for transmission based on the determined error and the first encoded media data is sent as a basic layer via the first network.

15. The communication apparatus of claim 13, wherein the error is determined to have occurred such that the first encoded media data transmitted after the error is determined to have occurred is sent via a basic layer.

16. The communication apparatus of claim 13, wherein the computer device is configured to determine that the determined error has been resolved and, in response to determining that the error has been resolved re-evaluate the networks for transmission of media data to the first terminal device during evaluation of the second status of connectivity.

17. The communication apparatus of claim 8, wherein the computer device is configured to perform re-evaluation of the networks for transmission of media data to the first terminal device as the first encoded media data is being transmitted to the first terminal device via the first network; and the computer device is configured such that, during the re-evaluation of the networks for transmission of the media data to the first terminal device, the computer device selects the first network to transmit the first encoded media data for transport as a basic layer based on a determination that the first network has a network quality and/or stability that is sufficient for transmitting the basic layer and selects the second network for transmission of the second encoded media data based upon bandwidth of at least one of the first network and the second network and the quality and stability of the networks for transmitting the second encoded media data to the first terminal device as at least one enhanced layer.

18. The communication apparatus of claim 17, wherein the computer device is configured to divide the media data into at least first and second portions for transmitting as the basic layer and at least one enhanced layer after selecting the first network and the second network when performing the re-evaluation of the networks.

19. The communication apparatus of claim 8, wherein the computer device is configured to utilize decision process input documents that define transport requirements, device properties of the first terminal device, and requirements of an application being run by the first terminal device to select the first network and the second network for transmission of the first encoded media data stream and the second encoded media data stream.

* * * * *